United States Patent Office 2,967,089
Patented Jan. 3, 1961

2,967,089
PROCESS FOR MAKING HEAVY WATER

George Alexander Mills, Swarthmore, and Sol W. Weller, Drexel Hill, Pa., and Leon W. Wright, Wilmington, Del., assignors to Houdry Process Corporation, Wilmington, Del., a corporation of Delaware No Drawing. Filed Nov. 25, 1955, Ser. No. 549,162

8 Claims. (Cl. 23—204)

The present invention relates to a process for enriching the deuterium content of water, and more particularly to a process for forming heavy water at relatively low temperatures.

In recent years there has been an increased demand for heavy water, or deuterium oxide, namely the isotopic compound of deuterium (hydrogen of mass 2) with oxygen. Prior commercial methods for the manufacture of heavy water have involved vapor phase reactions at elvated temperatures in the presence of fixed beds of supported platinum. These processes have produced relatively low yields of heavy water per pass. A description of a typical operation of this nature may be found in Chemical Engineering Progress, vol. 50, No. 5 for May 1954, starting at page 221.

The exchange reactions between deuterium and water to form hydrogen and heavy water, and between HD and water to form hydrogen and HDO are favored at low temperatures, as the equilibrium in the exchange reactions becomes increasingly favorable as the temperature is lowered.

This invention has as an object a provision of a catalytic method for the concentration of isotopic deuterium.

This invention has as another object the provision of a low temperature process for the concentration of isotopic deuterium.

This invention has as a further object the provision of a method for the concentration of isotopic deuterium as deuterium oxide.

This invention has likewise as an object provision of the method for the concentration of deuterium oxide in water.

These and other objects are accomplished by the process of the present invention in which liquid water is contacted with a hydrogen gas stream containing isotopic deuterium and in the presence of a solution of a complex cobalt cyanide salt of an alkali metal containing the cobalt in monovalent and/or divalent state. Preferably the process of the present invention is effected in an alkaline medium and at a temperature within the range of 0 to 50° C.; advantageous results are obtained at about room temperature. The alkalinity of the medium should lie within the range of pH 7 to 14+, with the pH range of 10 and above being preferred in many cases.

In addition, the presence of surfactant or surface tension reducing agents, and not excluding the foaming agents from this category, materially improves the rate of exchange by affecting and permitting to be effective a high degree of surface contact between the gas phase containing the deuterium and the solution in which the deuterium is being concentrated. Of particular interest are the surface tension reducing agents and a preferred embodiment is Dupont BCO manufactured by the E. I. du Pont de Nemours Company of Wilmington, Delaware. Dupont BCO is cetyl betaine and is preferably present in the concentration of 0.01 to 0.4 weight percent, with the range of 0.06 to 0.2 weight percent being preferred in many cases. Other agents which may be successfully employed include sodium lauryl sulfate and sodium keryl benzene sulfonate.

The process of the present invention is desirably effected when the liquid absorbent is in a high state of agitation. By thus increasing the opportunity for contact by rapid agitation and by the use of surface tension adjusting additives, the absorption rates of the deuterium either as $D_2$, HD, HDO, or $D_2O$ is benefited thereby.

The following description and examples for the sake of simplicity have been directed mainly to reaction procedure involving the use of highly purified deuterium. However, it is to be understood that the process of this invention is particularly desirable and advantageous in connection with the concentration of deuterium which appears in its normal percent of appearance as an isotope in hydrogen streams. This relatively small amount of deuterium is successfully concentrated into the desired high yields of heavy water and eventually deuterium by operation in accordance with the procedure of the specification and the appended claims. The methods of concentration and separation may be those described in the above-identified article in Chemical Engineering Progress, or may be any other suitable method.

The process of the present invention is preferably effected in the presence of complex cobalt cyanide salts of potassium. In particular, $K_3Co(CN)_5$ may be utilized. The divalent cobalt compound designated potassium cobalto cyanide has been indicated in earlier texts as having the formula $K_4Co(CN)_6$ but has been shown in more recent publications to be the pentacyano complex; see Adamson, J.A.C.S., vol. 73, p. 5710 (1951); Hume and Koltoff, J.A.C.S., vol. 71, p. 867 (1949); and Smith et al., J.A.C.S., vol. 75, p. 449 (1953). This salt can be reduced prior to or during the exchange reaction to $$K_4Co(CN)_5$$

In all cases, the cobalt should be present in the cobalt cyanide complex as either monovalent or divalent cobalt.

A rather broad range of concentrations of cobalt cyanide complex may be used, with the preferred range of cobalt cyanide complex concentration lying within the range 0.04 to 0.4 molar.

The exchange reaction of the present invention may be effected in aqueous solutions, or in partially aqueous solutions. In certain preferred embodiments of the present invention, agents which increase the solubility of deuterium, such as ethanol, methanol, or acetone may be added to the water so that as much as 80% of these solubilizing agents be present during the exchange reaction.

The process of the present invention may be effected over a wide range of pressures, such as subatmospheric, atmospheric or superatmospheric pressures. Pressures in excess of atmospheric pressure have the advantage of increasing the solubility of deuterium and accelerating the rate of exchange reaction.

The extent of exchange of deuterium in water in the following examples was derived by obtaining volume percent gas analyses after the reaction was effected, and ascertaining the replacement of the deuterium with hydrogen and with HD in the gas.

Example I

When substantially pure deuterium gas* at 525 mm. Hg pressure was contacted with 40 milliliters of 0.050 molar $K_3Co(CN)_5$** for 0.67 hour at 25° C. the gas analysis at the conclusion of the exchange reaction constituted 0.3 volume percent $H_2$; 2.3 volume percent HD and 97.4 volume percent $D_2$.

*99.3% $D_2$ 0.8% HD.
**Prepared by mixing in vacuo stoichiometric amounts of $CoCl_2.6H_2O$ and potassium cyanide solution.

Example II

Under similar conditions to those set forth in Example 1 save that 3.1 molar sodium hydroxide was present in addition to the aforementioned reactants, the gas analysis at the conclusion of the reaction was 3.5 volume percent $H_2$; 0.8 volume percent HD; and 95.7 volume percent $D_2$.

Example III

A 0.050 molar $K_3Co(CN)_5$ solution prepared as above, was reduced with hydrogen to the extent of 83% reduction to monovalent cobalt, and then the hydrogen was removed by vacuum, see Hume et al. above cited. Upon contacting the resultant solution with substantially pure deuterium, in the presence of 3.1 molar sodium hydroxide for a period of 1.2 hours, a gas having 7.4 volume percent $H_2$; 0.9 volume percent HD; and 91.7 volume percent $D_2$ was obtained at the conclusion of the exchange reaction.

Example IV

When a 0.050 molar $K_3Co(CN)_5$ solution was subjected to substantially pure deuterium gas under conditions similar to those of Example 1 for 2.0 hours the gas analysis at the conclusion of the exchange reaction was 10.9 volume percent $H_2$; 0.8 volume percent HD; and 88.3 volume percent $D_2$.

Example V

Under the conditions indicated in Example II but with the sodium hydroxide concentration increased to 6 molar, the gas analysis after 0.67 hour of exchange reaction was 2.4 volume percent $H_2$; 0.9 volume percent HD; and 96.7 volume percent $D_2$.

Example VI

Under the conditions set forth in Example II but with the sodium hydroxide concentration increased to 6 molar, the gas analysis after 2 hours of exchange reaction was 10.6 volume percent $H_2$; 0.9 volume percent HD; and 88.5 volume percent $D_2$.

Example VII

Under the conditions set forth in Example II but with the sodium hydroxide concentration increased to 6 molar, the gas analysis after 3 hours of exchange reaction was 22.3 volume percent $H_2$; 0.6 volume percent HD; and 77.1 volume percent $D_2$.

Example VIII

When a 0.050 molar $K_3Co(CN)_5$ solution without added alkali was subjected to substantially pure deuterium the gas analysis after 4 hours of exchange reaction was 1.2 volume percent $H_2$; 9.1 volume percent HD; and 89.7 volume percent $D_2$.

Example IX

Under similar conditions to those set forth in Example II the gas analysis after 4 hours of exchange reaction was 58.3 volume percent $H_2$; 0.5 volume percent HD; and 41.2 volume percent $D_2$.

Example X

Under the same conditions as those set forth in Example I, after 8.0 hours of exchange reaction the gas analysis was 12.4 volume percent $H_2$; 23.0 volume percent HD; and 64.6 volume percent $D_2$.

It will be noted from Examples II, III, V, VI, VII and IX that the yields in the exchange reaction were greatly benefited by increasing the concentration of alkali, and from Examples VIII, IX and X that the yields were appreciably benefited by prolonging the duration of contact between the deuterium and the water.

It was further found that by increasing the concentration of $K_3Co(CN)_5$ and by adding a minor amount, as for example, 0.3 volume percent of Dupont BCO foaming agent, the extent of deuterium exchange could be still further increased, particularly under conditions of vigorous agitation.

Example XI

Three drops of Dupont BCO foaming agent were added to 50 milliliters of 0.16 molar $K_3Co(CN)_5$ solution and the entire cobalt content in solution was reduced by hydrogen to the monovalent state. The hydrogen was then withdraw and the solution while under vigorous agitation was contacted with 300 milliliters of substantially pure deuterium gas at atmospheric pressure and a temperature of 25° C. The atom percent hydrogen content of the gas increased with increasing reaction time as follows:

| Time (min.): | Atom percent H |
|---|---|
| 0 | 0 |
| 25 | 45 |
| 39 | 53 |

Even in the absence of added foaming agent, the rate of reaction was greatly accelerated by increasing the concentration of $K_3Co(CN)_5$ and employing very vigorous agitation.

Example XII

Fifty milliliters of 0.16 molar $K_3Co(CN)_5$ solution was reduced by hydrogen so that the entire cobalt content was in the monovalent state. The hydrogen was then withdrawn and the solution while under vigorous agitation was contacted with 300 milliliters of substantially pure deuterium gas at atmospheric pressure and a temperature of 24° C. The atom percent hydrogen content of the gas increased with increasing reaction time as follows:

| Time (min.): | Atom percent H |
|---|---|
| 0 | 0 |
| 5 | 10 |
| 10 | 18 |
| 16 | 24 |
| 21 | 29 |
| 41 | 44 |

The present invention may be embodied in other specific forms without departing from the spirit or essential attributes thereof and, accordingly, reference should be made to the appended claims, rather than to the foregoing specification as indicating the scope of the invention.

It is claimed:

1. A process for enriching the deuterium oxide concentration of an aqueous alkaline system which consists of: contacting a deuterium containing gas with an alkaline aqueous liquid system maintained at a pH of at least 10 and at a temperature within the range of 0° C. to 50° C., said system containing a concentration within the range from 0.04 to 0.4 molar of an ion selected from the class consisting of $(Co^I(CN)_5)^{-4}$ and $(Co^{II}(CN)_5)^{-3}$ and mixtures thereof, whereby some of the deuterium gas participates in an isotope exchange reaction to enrich the deuterium oxide concentration of the aqueous system, and withdrawing from said aqueous system a gas containing a lowered concentration of deuterium.

2. A process in accordance with claim 1 in which a minor amount of a foaming agent is present in the water.

3. A process in accordance with claim 1 in which the pressure is maintained above one atmosphere.

4. A process for enriching the deuterium oxide concentration of an aqueous alkaline system which consists of: contacting a deuterium containing gas with an alkaline aqueous system maintained at a pH of at least 10 and at a temperature within the range from 0° C. to 50° C., said aqueous system containing tripotassiumcobaltpentacyanide in a concentration within the range from 0.04 to 0.4 molar; and withdrawing from said aqueous system a gas containing a lowered concentration of deuterium.

5. A process in accordance with claim 1 in which said aqueous liquid system contains tetrapotassiumcobaltpentacyanide.

6. A process for forming heavy water comprising the steps of. contacting a gas stream containing hydrogen and isotopic deuterium with a liquid aqueous alkaline system maintained at a pH of at least 10 and at a temperature within the range from 0° to 50° C., said system containing a concentration within the range from 0.04 to 0.4 molar of an ion selected from the class consisting of $(Co^I(CN)_5)^{-4}$ and $(Co^{II}(CN)_5)^{-3}$ to selectively absorb deuterium from said gas stream to form an aqueous system having an enriched concentration of deuterium oxide; separating and recovering said enriched mixture of deuterium oxide and water; decomposing a portion of said enriched water to obtain a hydrogen gas stream enriched in deuterium; contacting said enriched hydrogen stream with a liquid aqueous alkaline system maintained at a pH of at least 10 and at a temperature within the range from 0° to 50° C., said system containing a concentration within the range from 0.04 to 0.4 molar of an ion selected from the class consisting of $(Co^I(CN)_5)^{-4}$ and $(Co^{II}(CN)_5)^{-3}$ to further enrich said liquid; and repeating successively such partial decomposition of enriched liquid water and subsequent contacting of enriched hydrogen to obtain an aqueous system having a high concentration of deuterium oxide.

7. A process for the separation and recovery of deuterium which includes selectively absorbing deuterium from a gas stream containing free and exchangeable deuterium by contacting such a gas stream at a temperature of from 0° to 50° C. with a liquid aqueous alkaline system maintained at a pH of at least 10 and containing a concentration within the range from 0.04 to 0.4 molar of ion selected from the class consisting of $(Co^I(CN)_5)^{-4}$ and $(Co^{II}(CN)_5)^{-3}$ and at a gas pressure in the range of 1–10 atmospheres to enrich said liquid aqueous system in deuterium content by said contact; and separating and recovering deuterium from said enriched water.

8. The process of claim 1 in which the aqueous alkaline system contains a solvent selected from the class consisting of methanol, ethanol and acetone.

References Cited in the file of this patent

UNITED STATES PATENTS

| 1,843,862 | Buc | Feb. 2, 1932 |
| 2,690,379 | Urey et al. | Sept. 28, 1954 |

OTHER REFERENCES

Williams: "Cyanogen Compounds," 2nd edition, 1948, pp. 106–112.

Ephraim: "Inorganic Chemistry," 4th edition, revised, 1943, pp. 155, 305.

Journal American Chemical Society, vol. 73, pp. 5710–13 (December 1951).

Ogg: "Abstracts of Papers, 123rd Meeting, American Chemical Society," 1953, page 24P.